(12) United States Patent
Chen et al.

(10) Patent No.: US 10,969,537 B2
(45) Date of Patent: Apr. 6, 2021

(54) DISPLAY DEVICE HAVINH A SUBSTRATE AND LIGHT GUIDE WITH AT LEAST ONE ADHESIVE LATER AFFIXED TO THE SIDE SURFACES THEREOF

(71) Applicant: InnoLux Corporation, Miao-Li County (TW)

(72) Inventors: Chieh-Ying Chen, Miao-Li County (TW); Ming-Yen Lin, Miao-Li County (TW); Chun-Hsu Lin, Miao-Li County (TW); Ming-Feng Hsieh, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/575,788

(22) Filed: Sep. 19, 2019

(65) Prior Publication Data

US 2020/0124787 A1    Apr. 23, 2020

(30) Foreign Application Priority Data

Oct. 22, 2018 (CN) .......................... 201811228705.3

(51) Int. Cl.
*F21V 8/00* (2006.01)
*G02F 1/1335* (2006.01)

(52) U.S. Cl.
CPC ..... *G02B 6/0086* (2013.01); *G02F 1/133512* (2013.01); *G02F 2202/28* (2013.01)

(58) Field of Classification Search
CPC .......................... G02F 2202/28; G02B 6/0086
See application file for complete search history.

(56) References Cited

U.S. PATENT DOCUMENTS

| 7,413,336 B2 * | 8/2008 | Freking ................. B32B 43/006 362/606 |
| 9,971,191 B2 * | 5/2018 | Cho ................... G02F 1/133617 |
| 2005/0046767 A1 * | 3/2005 | Freking .................... G02B 7/00 349/62 |
| 2017/0248808 A1 * | 8/2017 | Hsu ........................ G02F 1/1335 |

* cited by examiner

*Primary Examiner* — Robert J May
(74) *Attorney, Agent, or Firm* — Muncy, Geissler, Olds & Lowe, P.C.

(57) ABSTRACT

A display device is disclosed, including: a display panel including a first substrate with a first side surface; a backlight module disposed opposite the display panel and including a light guide having a second side surface; and a first adhesive layer attached to the first side surface and the second side surface.

18 Claims, 8 Drawing Sheets

DISPLAY DEVICE HAVINH A SUBSTRATE AND LIGHT GUIDE WITH AT LEAST ONE ADHESIVE LATER AFFIXED TO THE SIDE SURFACES THEREOF

CROSS REFERENCE TO RELATED APPLICATION

This application also claims the benefits of the Chinese Patent Application Serial Number 201811228705.3, filed on Oct. 22, 2018, the subject matter of which is incorporated herein by reference.

BACKGROUND

1. Field of the Disclosure

The present disclosure relates to display devices and, more particularly, to a display device with an adhesive layer.

2. Description of Related Art

To get in line with technological advancement and meet consumer needs, display devices not only follow the trend of being lighter, thinner, shorter or smaller, but its facilitating sophisticated peripheral vision is also important that display device manufacturers endeavor to conduct research on narrow border designs.

However, a backlight module and a display panel, which are essential components of a conventional display device, have to be fixed in place, using plenty middle frames, screws and related elements. As a result, not only are limitations placed on the thickness of the display device, but the middle frames and related elements are also noticeably visible on the borders of display panel to the detriment of enjoyable presentation. Furthermore, the prior art is disadvantaged by numerous, complicated assembly steps, a plethora of parts and components; or high costs.

Therefore, it is imperative to provide a display device conducive to simple processes and narrow border designs.

SUMMARY

In view of the aforesaid drawbacks of the prior art, it is an objective of the present disclosure to provide a display device which comes with an adhesive layer and thereby are conducive to simple processes, narrow border designs, and or thinning.

In order to achieve the above and other objectives, the present disclosure provides a display device, comprising: a display panel comprising a first substrate having a first side surface; a backlight module disposed opposite the display panel and comprising a light guide having a second side surface; and a first adhesive layer attached to the first side surface and the second side surface.

DETAILED DESCRIPTION OF THE EMBODIMENTS

The implementation of the present disclosure is illustrated by specific embodiments to enable persons skilled in the art to easily understand the other advantages and effects of the present disclosure by referring to the disclosure contained therein. The present disclosure is implemented or applied by other different, specific embodiments. Various modifications and changes can be made in accordance with different viewpoints and applications to details disclosed herein without departing from the spirit of the present disclosure.

Ordinal numbers, such as "first", "second", "third", "fourth", used herein are intended to distinguish components rather than disclose explicitly or implicitly that names of the components bear the wording of the ordinal numbers. The ordinal numbers do not imply what order a component and another component are in terms of space, time or steps of a manufacturing method. The ordinal numbers are only intended to distinguish a component with a name from another component with the same name.

Furthermore, position-related words, such as "on top of", "on" and "above", used herein are descriptive of two components in direct or indirect contact with each other.

The present disclosure is illustrated by embodiments below, but the present disclosure is not limited thereto. Instead, the present disclosure may combine with any other known structures to create some more embodiments.

Figure 1:
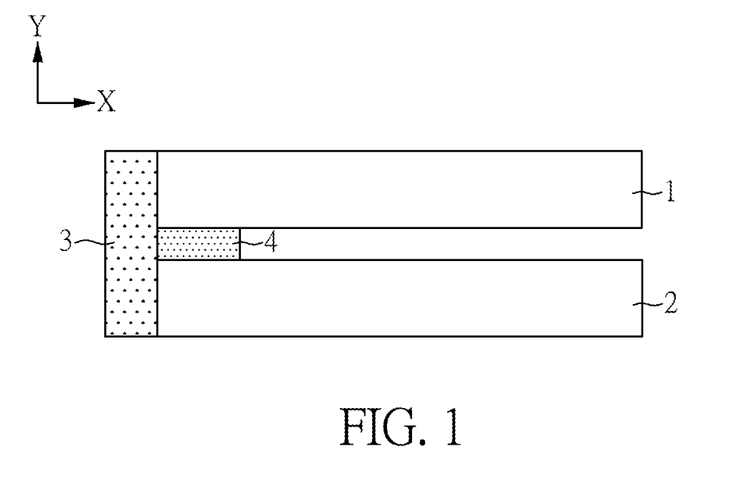
FIG. 1 is a schematic view of part of a display device according to an embodiment of the present disclosure.
Figure 2:
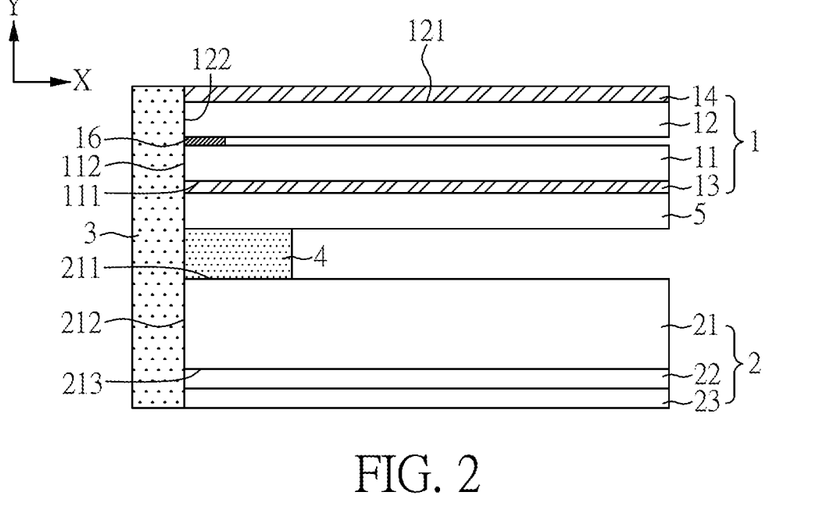
FIG. 2 is a cross-sectional view of part of the display device according to an embodiment of the present disclosure.

Referring to FIG. 1 and FIG. 2, FIG. 1 is a schematic view of part of a display device according to an embodiment of the present disclosure, and FIG. 2 is a cross-sectional view of part of the display device according to an embodiment of the present disclosure. As shown in FIG. 1, the display device of the present disclosure comprises: a display panel 1; a backlight module 2 disposed opposite the display panel 1; and a first adhesive layer 3 disposed on one side of the display panel 1 and the backlight module 2. Referring to FIG. 2, the display panel 1 of the present disclosure comprises: a first substrate 11 which has a first surface 111 and connects to a first side surface 112 of the first surface 111; and a second substrate 12 having another surface 121, connected to another side surface 122 of the another surface 121, and disposed opposite to the first substrate 11. The backlight module 2 comprises a light guide 21. The light guide 21 has a second surface 211 connected to a second side surface 212 of the second surface 211. The first surface 111 opposes the second surface 211.

The display panel 1 and the light guide 21 are fixed in place by the first adhesive layer 3. In an embodiment, the first adhesive layer 3 is attached to the first side surface 112 and second side surface 212, whereas any other adhesive layer or coating layer may be disposed between the first adhesive layer 3 and the first side surface 112 or second side surface 212, provided that the display panel 1 and the light guide 21 are fixed in place. In an embodiment, the first adhesive layer 3 is in contact with the first side surface 112 and the second side surface 212. In another embodiment, the first adhesive layer 3 is attached to the first side surface 112 of the first substrate 11, the another side surface 122 of the second substrate 12, and the second side surface 212 of the light guide 21. In another embodiment, the first adhesive layer 3 is in contact with the display panel 1 and the light guide 21. The backlight module 2 further comprises: a reflection sheet 22 disposed on a third surface 213 of the light guide 21; and a back film 23 disposed on the reflection sheet 22. The third surface 213 opposes the second surface 211. The display device is characterized in that the display panel 1 and the backlight module 2 are fixed in place by the first adhesive layer 3; hence, the display device is conducive to simple processes, narrow border designs, or thinning.

In another embodiment, the display device comprises a second adhesive layer 4 disposed between the display panel 1 and the backlight module 2. Therefore, the display device is characterized in that the display panel 1 and the backlight module 2 are fixed in place by the second adhesive layer 4 and thereby is conducive to simple processes or thinning. In any single embodiment, the first adhesive layer and the second adhesive layer are either mutually exclusive or can coexist, as needed.

As shown in FIG. 2, optionally, the display device comprises an optical film 5 disposed on the first surface 111 of the first substrate 11. The optical film 5 and the light guide 21 are fixed in place by the second adhesive layer 4. In an embodiment, the second adhesive layer 4 is attached to two opposing surfaces of the optical film 5 and the light guide 21, respectively. Any other adhesive layer or coating layer may be disposed between the second adhesive layer 4, the optical film 5 and the light guide 21, provided that the optical film 5 and the light guide 21 are fixed in place. In another embodiment, the second adhesive layer 4 is in contact with the optical film 5 and the light guide 21. The optical film 5 has a monolayered or multilayered structure. Another adhesive layer or coating layer is disposed between the optical film 5 and the display panel 1 such that the optical film 5 can be attached to the display panel 1. The multilayered structure may comprise a diffusion film, a brightness enhancement film, or a combination thereof. The monolayered structure is a composite film, and the composite film is capable of diffusion, brightness enhancement, or concealment, but the present disclosure is not limited thereto. The display panel 1 of the present disclosure further comprises: a first polarizer 13 disposed on the first surface 111 of the first substrate 11; and a second polarizer 14 opposing the first polarizer 13. The first polarizer 13 is disposed between the first substrate 11 and the optical film 5. In another embodiment, the first polarizer 13 and the optical film 5 may be integrated. In this embodiment, the dimensions of the first polarizer 13 are the same as the dimensions of the second polarizer 14. However, in another embodiment, the dimensions of the first polarizer 13 are different from the dimensions of the second polarizer 14; for example, the first polarizer 13 has a greater area than the second polarizer 14. Nonetheless, the aforesaid embodiments are not limited thereto and thus are subject to changes as needed.

The first substrate 11 and the second substrate 12 are rigid substrates, flexible substrates or films. The first substrate 11 and the second substrate 12 comprise the same or different materials. The material which the first substrate 11 and the second substrate 12 comprise is, for example, a quartz substrate, a glass substrate, a wafer substrate, a sapphire substrate, polycarbonate (PC), polyimide (PI), polypropylene (PP), polyethylene terephthalate (PET), any other plastic, or any other polymer, but the present disclosure is not limited thereto.

The material which the reflection sheet 22 comprises may be metal, white ink, polyimide (PI), resin or a combination thereof, provided that the material is suitable for a reflection light source, but the present disclosure is not limited thereto. The back film 23 comprises the same material as the first substrate 11 and the second substrate 12. The first substrate 11, the second substrate 12 and the back film 23 comprise the same or different materials.

The material which the first adhesive layer 3 and the second adhesive layer 4 comprise, for example, glass glue, optical glue, silica gel, adhesive tape, hot-melt adhesive, AB glue, two-component adhesive, polymeric glue, or a combination thereof, but the present disclosure is not limited thereto. Transmittance of the first adhesive layer 3 ranges from 0% to 1%. Transmittance of the second adhesive layer 4 ranges from 10% to 50%. The first adhesive layer 3 is, for example, a black glue for decreasing lateral leakage. The second adhesive layer 4 is, for example, a pale gray glue for decreasing formation of bright bands on the light guide 21 to the detriment of display quality. The first adhesive layer 3 and the second adhesive layer 4 comprise the same or different materials, but the present disclosure is not limited thereto.

The way the first adhesive layer 3 is coated is not subject to limitations and entails adhering a flat adhesive to the first adhesive layer 3 or performing a coating process. The coating process is, for example, screen printing, one drop filling, slit coating or nozzle printing, but the present disclosure is not limited thereto. The first adhesive layer 3 and the second adhesive layer 4 may be coated in the same way or in different ways. In an aspect of the present disclosure, the first adhesive layer 3 is a single-side adhesive layer, and the second adhesive layer 4 is a double-side adhesive layer. In another aspect of the present disclosure, the first adhesive layer 3 is a double-side adhesive layer, and the second adhesive layer 4 is a double-side adhesive layer, but the present disclosure is not limited thereto.

In an embodiment, as shown in FIG. 2, at least part of the first adhesive layer 3 is in contact with the second adhesive layer 4, but the present disclosure is not limited thereto. In another aspect of the present disclosure, the first adhesive layer 3 is separated from the second adhesive layer 4. Furthermore, as shown in FIG. 2, the first adhesive layer 3 is in contact with the first polarizer 13 and the optical film 5, but the present disclosure is not limited thereto. In another aspect of the present disclosure, the first adhesive layer 3 is separated from the first polarizer 13 and/or the optical film 5.

According to the present disclosure, the display panel 1 further comprises a display medium (not shown) disposed between the first substrate 11 and the second substrate 12. The display medium is a non-self-luminous display medium. For example, the non-self-luminous display medium comprises liquid crystals (LCs).

Figure 3:
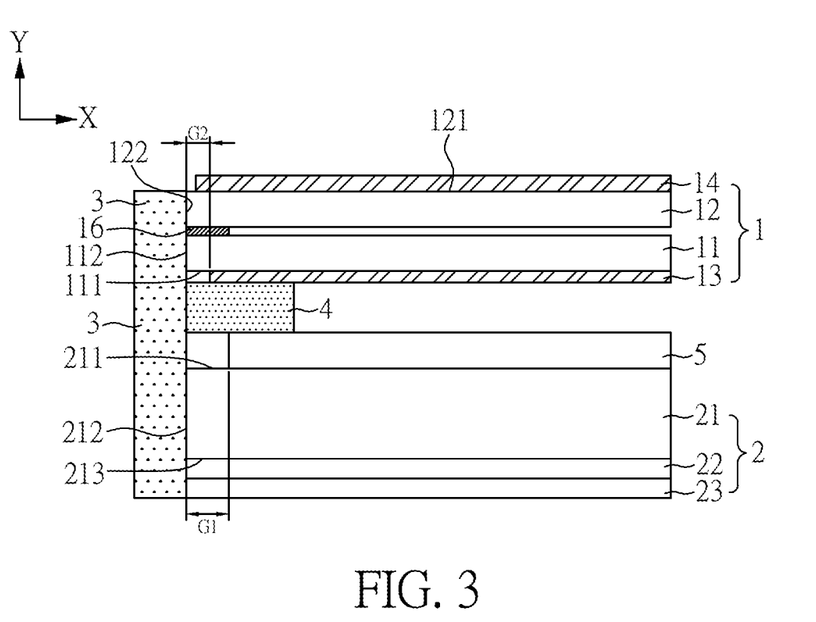
FIG. 3 is a cross-sectional view of part of the display device according to an embodiment of the present disclosure.

FIG. 3 is a cross-sectional view of part of the display device according to an embodiment of the present disclosure. The display device of FIG. 3 is similar to the display device of FIG. 2, except for the following: the optical film 5 is disposed on the second surface 211 of the light guide 21; the first adhesive layer 3 is spaced apart from the optical film 5 and the first polarizer 13 by distance G1, distance G2, respectively; the second adhesive layer 4 is in contact with the optical film 5 and the first polarizer 13; and the distance G1, distance G2 may not be equal, and render a manufacturing process easy, enhance optical quality, or increase design flexibility. At least part of the first adhesive layer 3 is in contact with second adhesive layer 4, but the present disclosure is not limited thereto. In another aspect of the present disclosure, the first adhesive layer 3 is separated from the second adhesive layer 4. The first adhesive layer 3 is separated from the optical film 5 and the first polarizer 13, but the present disclosure is not limited thereto. In another aspect of the present disclosure, the first adhesive layer 3 is in contact with the optical film 5 and/or the first polarizer 13.

Figure 4:
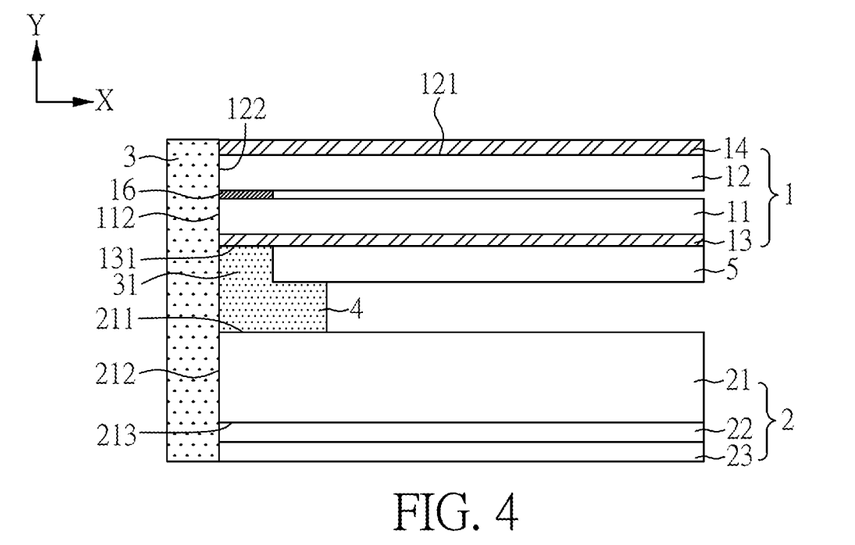
FIG. 4 is a cross-sectional view of part of the display device according to an embodiment of the present disclosure.

FIG. 4 is a cross-sectional view of part of the display device according to an embodiment of the present disclosure. The display device of FIG. 4 is similar to the display device of FIG. 2, except that the second adhesive layer 4 is in contact with the first polarizer 13 and the light guide 21. As shown in FIG. 4, the optical film 5 is disposed on a fourth surface 131 of the first polarizer 13. The optical film 5 is separated from and thus not in contact with the first adhesive layer 3. The fourth surface 131 opposes the second surface 211. Therefore, at least part of the second adhesive layer 4 is in contact with the first polarizer 13 through a gap 31 between the optical film 5 and the first adhesive layer 3. At least part of the first adhesive layer 3 is in contact with the second adhesive layer 4, but the present disclosure is not limited thereto. In another aspect of the present disclosure, the first adhesive layer 3 is separated from the second adhesive layer 4. In another aspect of the present disclosure, the optical film 5 is disposed on the second surface 211 of the light guide 21.

Figure 5:
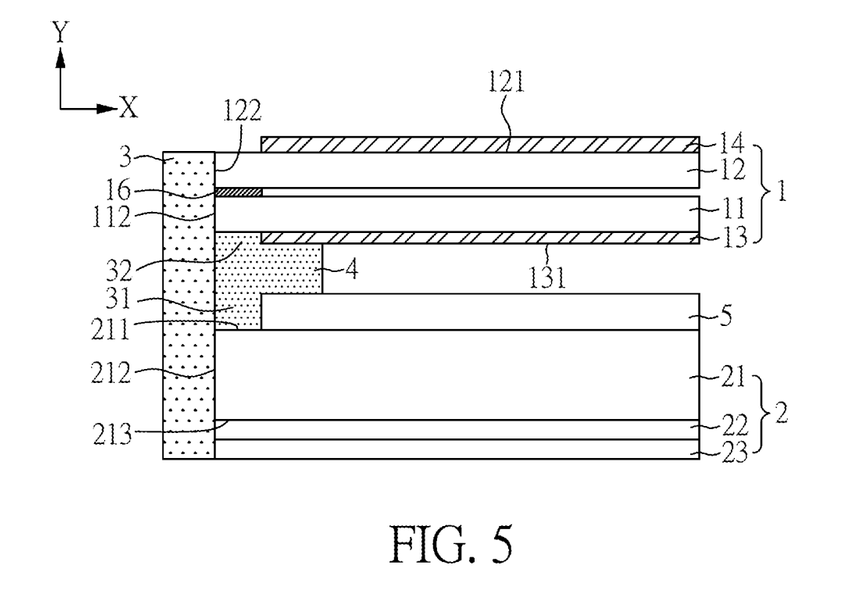
FIG. 5 is a cross-sectional view of part of the display device according to an embodiment of the present disclosure.

FIG. 5 is a cross-sectional view of part of the display device according to an embodiment of the present disclosure. The display device of FIG. 5 is similar to the display device of FIG. 4, except that the optical film 5 is disposed on the second surface 211 of the light guide 21, and that the second adhesive layer 4 is in contact with the optical film 5 and the first substrate 11. The second adhesive layer 4 is further in contact with the first substrate 11 and the light guide 21. As shown in FIG. 5, the optical film 5 and the first polarizer 13 are separated from and thus not in contact with the first adhesive layer 3. Therefore, at least part of the second adhesive layer 4 is in contact with the first substrate 11 and the light guide 21 through the gap 31 between the optical film 5 and the first adhesive layer 3 and a gap 32 between the first polarizer 13 and the first adhesive layer 3, respectively, but the present disclosure is not limited thereto. In another aspect of the present disclosure, the optical film 5 is in contact with the first adhesive layer 3, and thus at least part of the second adhesive layer 4 is in contact with the optical film 5 and the first substrate 11 through the gap 32 between the first polarizer 13 and the first adhesive layer 3.

At least part of the first adhesive layer 3 is in contact with the second adhesive layer 4, but the present disclosure is not limited thereto. In another aspect of the present disclosure, the first adhesive layer 3 is separated from the second adhesive layer 4. The optical film 5 is disposed on the second surface 211 of the light guide 21, but the present disclosure is not limited thereto. In another aspect of the present disclosure, the optical film 5 is disposed on the fourth surface 131 of the first polarizer 13.

Figure 6A:
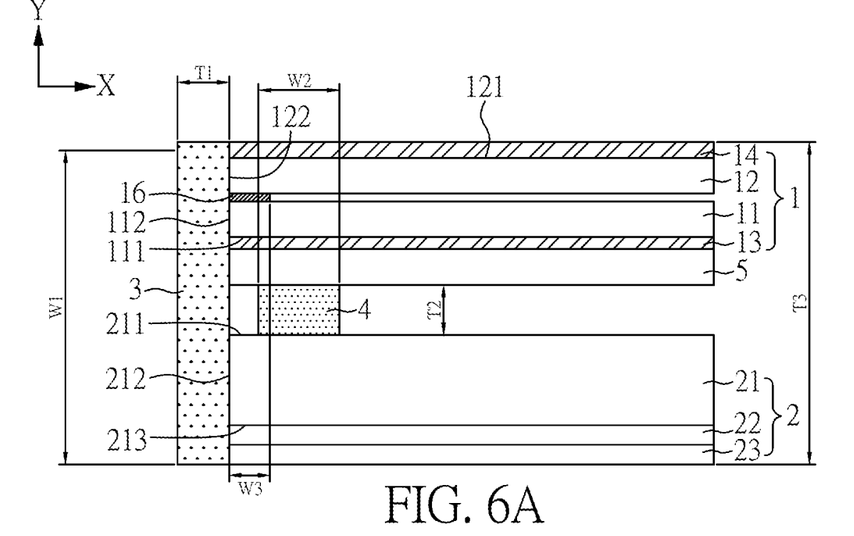
FIG. 6A is a cross-sectional view of part of the display device according to an embodiment of the present disclosure.
Figure 6B:
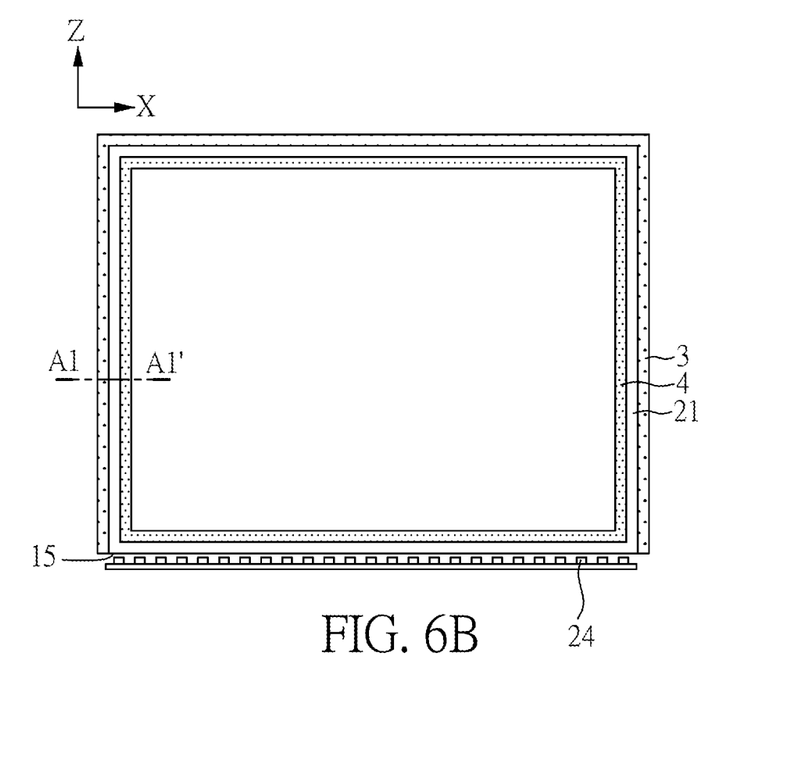
FIG. 6B is a top view of part of the display device according to an embodiment of the present disclosure.

Referring to FIG. 6A and FIG. 6B, FIG. 6A is a cross-sectional view of part of the display device according to an embodiment of the present disclosure, and FIG. 6B is a top view of part of the display device according to an embodiment of the present disclosure. The display device of FIG. 6A is similar to the display device of FIG. 3, except that the first adhesive layer 3 is separated from the second adhesive layer 4. In an embodiment, FIG. 6A is a cross-sectional view along line A1-A1' of FIG. 6B, showing that the second adhesive layer 4 has a substantially linear pattern in a top-view direction, and that the second adhesive layer 4 is disposed at the periphery of the light guide 21. The backlight module 2 of it the present disclosure further comprises a light source 24 disposed on an incident side 15 of the display panel 1. The first adhesive layer 3 is disposed at the periphery of the display panel 1 and the backlight module 2 but not on the incident side 15 of the display panel 1. Therefore, according to the present disclosure, the display device is characterized in that the display panel 1 and the backlight module 2 are fixed in place by the first adhesive layer 3 without affecting the display quality of the display device. The first adhesive layer 3 consists of segments may comprises the same or different materials, and the automation process could be easier. The first adhesive layer 3 undergoes an adhesion process which no longer requires directional rotation when manipulated in different directions, thereby speeding up the adhesion process. Alternatively, the first adhesive layer 3 consists of a plurality of linear patterns conducive to enhancement of aesthetic appearance of the display device.

Regarding the display device of the present disclosure, as shown in FIG. 6A, the first surface 111 has a normal direction (second direction Y). The first adhesive layer 3 has a first thickness T1 in a direction perpendicular to the normal direction (second direction Y) of the first surface 111, and the first thickness T1 ranges from 1 µm to 1000 µm. The first adhesive layer 3 has a first width W1 in the normal direction (second direction Y) of the first surface 111, and the first width W1 ranges from 0.1 mm to 10 mm. The second adhesive layer 4 has a second width W2 in a direction perpendicular to the normal direction (second direction Y) of the first surface 111, and the second width W2 ranges from 0.1 mm to 10 mm. The second adhesive layer 4 has a second thickness T2 in the normal direction (second direction Y) of the first surface 111, and the second thickness T2 ranges from 1 µm to 1000 µm.

In an aspect of the present disclosure, a black matrix 16 is disposed at the periphery of the display region of the display panel 1, on the first substrate 11 or the second substrate 12, and between the first substrate 11 and the second substrate 12. The black matrix 16 has a third width W3 in a direction perpendicular to the normal direction (second direction Y) of the first surface 111. The second adhesive layer 4 has a second width W2. The second width W2 ranges from 0.1 time the third width W3 to 10 times the third width W3. In another aspect of the present disclosure, the second adhesive layer 4 has a second thickness T2 in the normal direction (second direction Y) of the first surface 111.

The first adhesive layer 3 has a first width W1. The sum of the total thickness of the display panel 1, the optical film 5 and the backlight module 2 and the second thickness T2 is defined as a third thickness T3. The first width W1 is less than or equal to the third thickness T3. In this embodiment, the third thickness T3 is less than 5 mm and thus conducive to thinning better than conventional thinning. The black matrix 16 is near the glass edge and close to the first adhesive layer 3. The black matrix 16 is spaced apart from the glass edge by a distance.

Figure 7A:
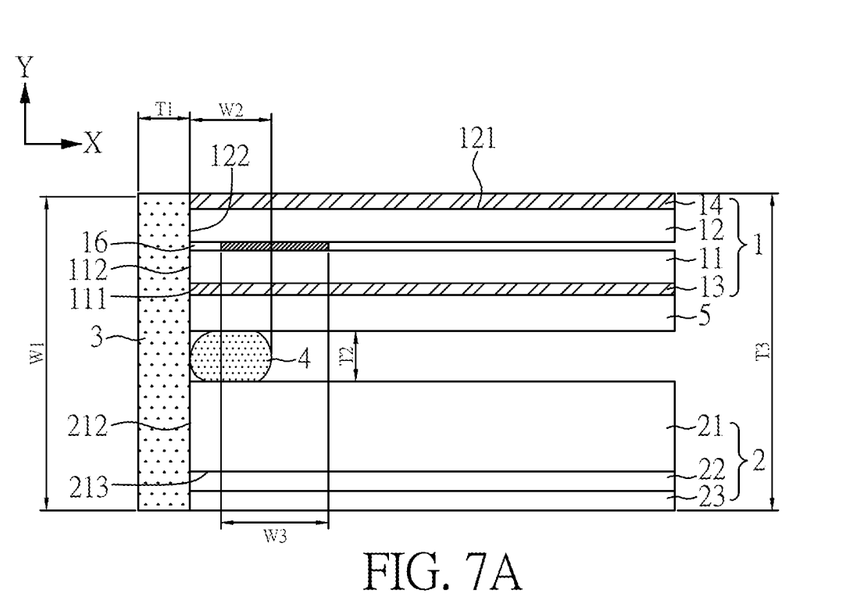
FIG. 7A is a cross-sectional view of part of the display device according to another embodiment of the present disclosure.
Figure 7B:
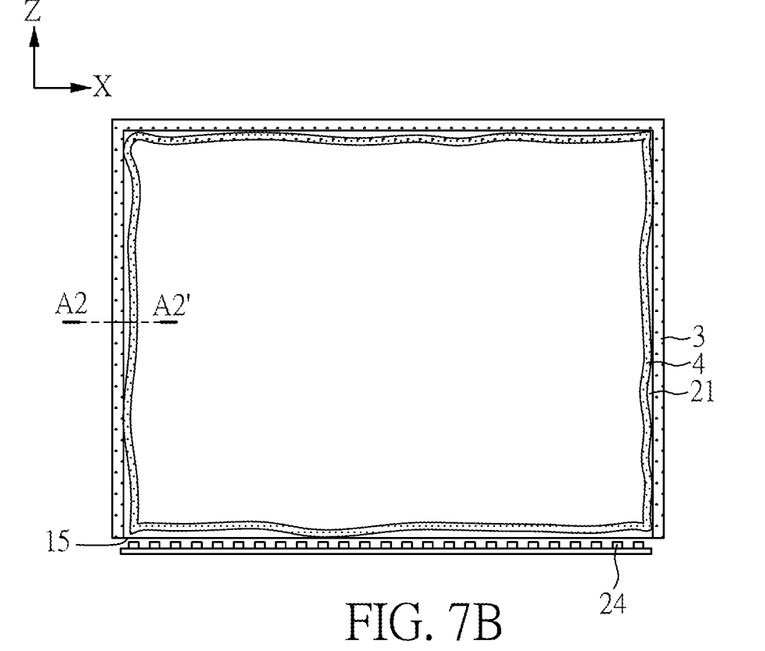
FIG. 7B is a top view of part of the display device according to an embodiment of the present disclosure.

Referring to FIG. 7A and FIG. 7B, FIG. 7A is a cross-sectional view of part of the display device according to another embodiment of the present disclosure, and FIG. 7B is a top view of part of the display device according to an embodiment of the present disclosure. In an embodiment, FIG. 7A is a cross-sectional view along line A2-A2' of FIG. 7B. The display device of FIG. 7A is similar to the display device of FIG. 6A, except that, when viewed from above, at least part of at least an edge of the second adhesive layer 4 is curved, for example, circular arc or wavy. In another embodiment, part of the first adhesive layer 3 is or is not in contact with the second adhesive layer 4, but the present disclosure is not limited thereto. The second width W2 of the second adhesive layer 4 is defined as a measured width in first direction X viewed from above, as shown in FIG. 7A, and the second width W2 ranges from 0.2 mm to 0.5 mm, thereby achieving narrow border designs. In another embodiment of the present disclosure, the first thickness T1 of the first adhesive layer 3 ranges from 200 μm to 600 μm, whereas the second width W2 of the second adhesive layer 4 is small and ranges from 0.1 mm to 0.2 mm, and in consequence the display device appears in its entirety to have ultra-narrow borders or no borders.

In an aspect of the present disclosure, when viewed from above, at least part of the segment of at least an edge of the second adhesive layer 4 is curved, for example, circular arc or wavy, and the first adhesive layer 3 is separated from the second adhesive layer 4. With the second adhesive layer 4 being curved, for example, wavy, the attachment area of the adhesive layer is increased, thereby increasing the strength of bonding between the display panel 1 and the backlight module 2. At least one side of the second adhesive layer 4 is curved, for example, is wavy, and the light may be blurred, the peripheral display quality may be enhanced. The shapes of the aforesaid elements in this embodiment also apply to those in the other embodiments, and thus the present disclosure is not limited thereto. The second adhesive layer 4 comes with low transmittance or pale gray color to allow the edge to be flat and turn into a dark band, thereby enhancing peripheral display quality. The second adhesive layer 4 is adhered in such a manner that the human eye will not see an encircled conspicuous dark band at the periphery of the display region, thereby enhancing edge quality. The wavy second adhesive layer 4, coupled with the optical film 5 or a polarizer, enhances edge concealment and thereby enhances edge quality. The second adhesive layer 4 varies in thickness gradually and thus enhances edge concealment. Alternatively, the black matrix 16, relatively broader, hides the second adhesive layer 4 and thus offers more choices of materials which the second adhesive layer 4 is made of. The black matrix 16 and the second adhesive layer 4 operate in conjunction with each other in a manner described above, but the present disclosure is not limited thereto.

Figure 8A:
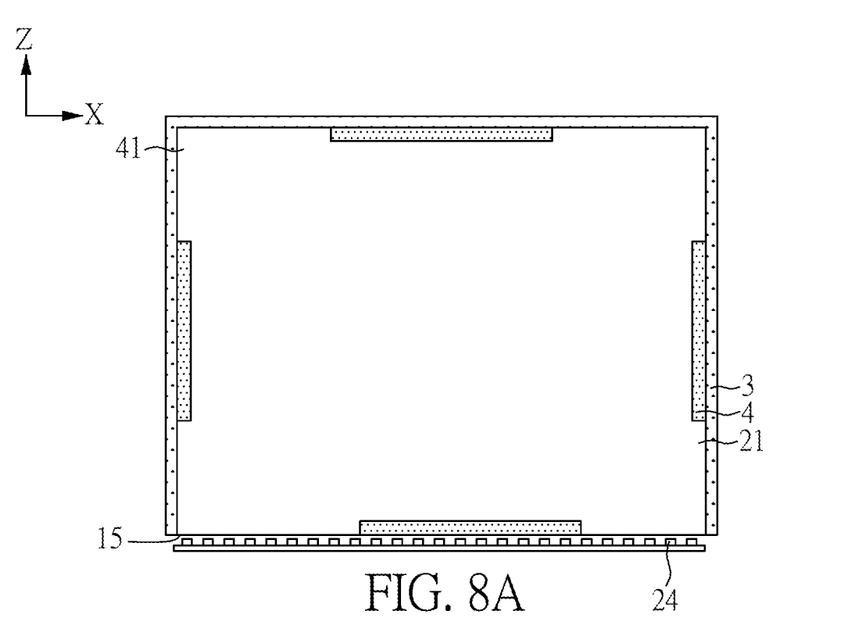
FIG. 8A and FIG. 8B are top views of part of the display device according to an embodiment of the present disclosure.
Figure 8B:
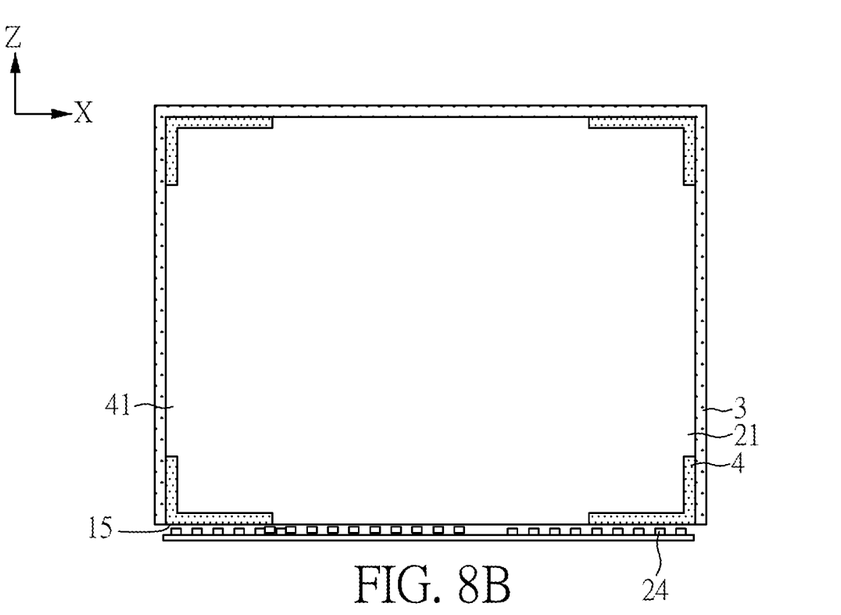

Referring to FIG. 6B and FIG. 7B, the second adhesive layer 4 is disposed at the periphery of the optical film 5, but the present disclosure is not limited thereto. In an aspect of the present disclosure, as shown in FIG. 8A, when viewed from above, the second adhesive layer 4 is disposed at the periphery of the light guide 21, and the second adhesive layer 4 has a plurality of openings 41. In another aspect of the present disclosure, as shown in FIG. 8B, when viewed from above, the second adhesive layer 4 is disposed at four corners of the light guide 21, the second adhesive layer 4 has the plurality of openings 41, and increase the amount of air discharged from between the display panel 1 and the backlight module 2 during an automated pairing process, increase air-tightness between the display panel 1 and the backlight module 2, and minimize the chance that the display device will bulge or malfunction as a result of air encapsulation. The second adhesive layer 4 is provided in the form of a plurality of linear strips, dots, structures of any shape, or a combination thereof, but the present disclosure is not limited thereto. Referring to FIG. 8A and FIG. 8B, the second adhesive layer 4 is at least in contact with or not in contact with part of the first adhesive layer 3.

Figure 9:
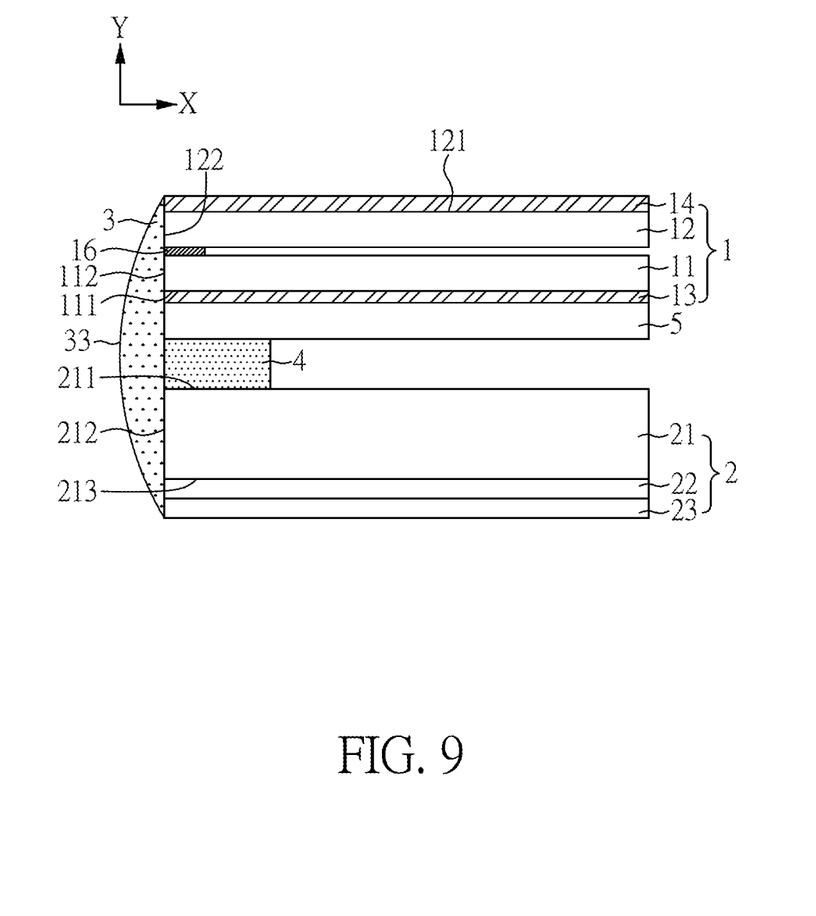
FIG. 9 is a cross-sectional view of part of the display device according to an embodiment of the present disclosure.

FIG. 9 is a cross-sectional view of part of the display device according to an embodiment of the present disclosure. The display device of FIG. 9 is similar to the display device of FIG. 2, except that the first adhesive layer 3 has a fifth surface 33 with a substantially curved portion or multiple substantially curved portions when viewed from a cross-sectional view, and has at least two different widths in first direction X, or at least part of the fifth surface 33 is curved, but the present disclosure is not limited thereto; for instance, the fifth surface 33 is an irregular surface. The first adhesive layer 3 is coated by an automated coater or adhered by an automated laminator. The first adhesive layer 3 may comprises different adhesive materials concurrently or alternately. After the first adhesive layer 3 has been adhered, it undergoes imprint patterning and thus assumes an uneven surface or special pattern, thereby attaining additional effects, such as beautification, or frosting. Alternatively, the first adhesive layer 3 is of different thickness and thereby is better integrated with or fixed to the display panel 1 or the backlight module 2, or may increase the adhesion area between the first adhesive layer 3 and any other layer, and may increase the integration or fixation capability of the display device.

Figure 10A:
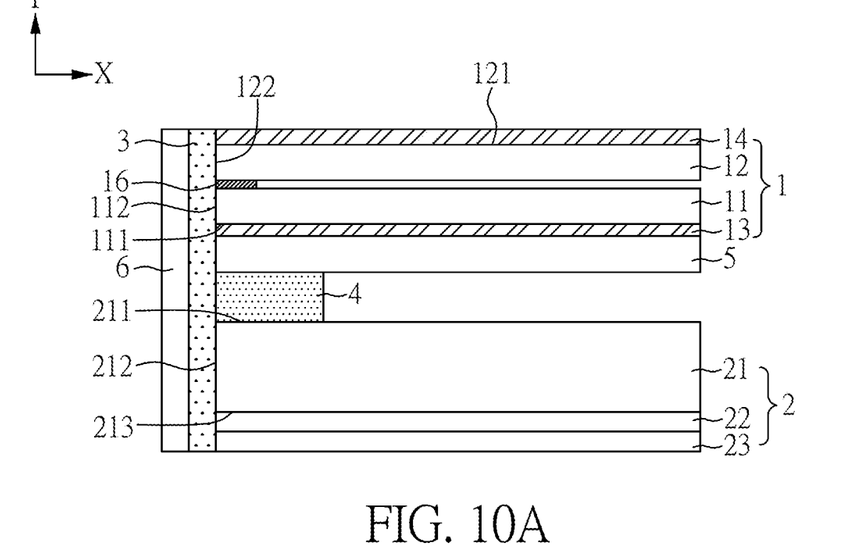
FIG. 10A is a cross-sectional view of part of the display device according to an embodiment of the present disclosure.

FIG. 10A is a cross-sectional view of part of the display device according to an embodiment of the present disclosure. The display device of FIG. 10A is similar to the display device of FIG. 2, except that the display device further comprises a decorative layer 6 disposed on the outer side of the first adhesive layer 3, and that the first adhesive layer 3 is disposed on the decorative layer 6 and between the display panel 1 and the backlight module 2. In this embodiment, the decorative layer 6 and the back film 23 may comprises the same or different materials.

Figure 10B:
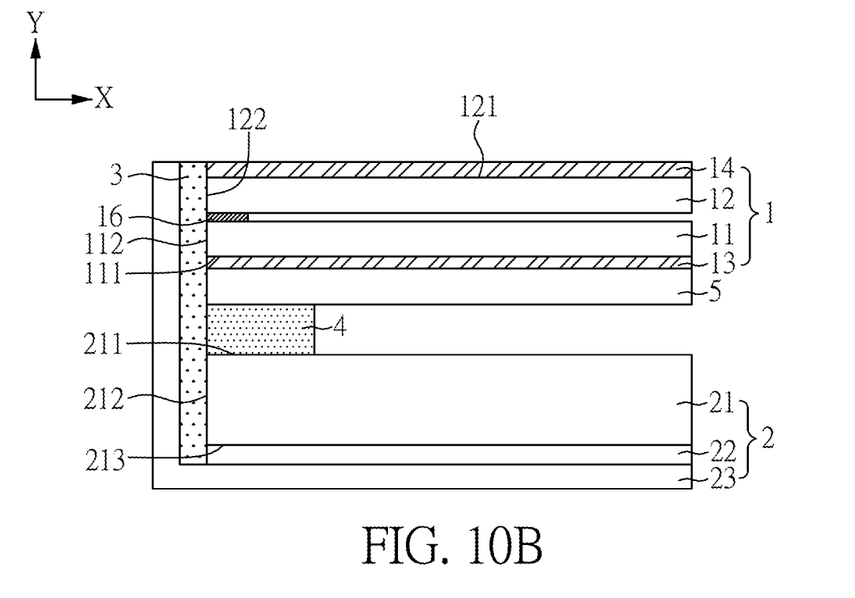
FIG. 10B is a cross-sectional view of part of the display device according to another embodiment of the present disclosure.

FIG. 10B is a cross-sectional view of part of the display device according to another embodiment of the present disclosure. The display device of FIG. 10B is similar to the display device of FIG. 10A, except that the back film 23 of the backlight module 2 is disposed on the reflection sheet 22 and extended to the outer side of the first adhesive layer 3, and that the first adhesive layer 3 is disposed on the back film 23 and between the display panel 1 and the backlight module 2. Therefore, this embodiment is characterized in that the back film 23 functions as a decorative layer, and dispense with a dedicated decorative layer, minimize any additional, subsequent process otherwise required to achieve aesthetic processing, or augment the adhesion strength of the display device in its entirety due to the encapsulation characteristics of the back film 23.

In conclusion, the present disclosure advantageously enables selective use of adhesive layers, and simplifies manufacturing processes, cut costs, or achieve narrow borders or thinning. Top views FIG. 6B, FIG. 7B, FIG. 8A, and FIG. 8B may selectively include structures, or a combination thereof, shown in cross-sectional views FIG. 1~FIG. 6A, FIG. 7A, and FIG. 9~10B, provided that the outcome does not depart from the spirit embodied in the present disclosure.

The above embodiments shall be interpreted to be illustrative but shall not limit remaining parts of the disclosure in any way. Features of different embodiments may be combined, provided that the features are not in conflict with each other.

What is claimed is:

1. A display device, comprising:
   a display panel comprising a first substrate having a first side surface;
   a backlight module disposed opposite to the display panel, the backlight module comprising a light guide having a second side surface;
   a first adhesive layer attached to the first side surface and the second side surface;
   a second adhesive layer disposed between the display panel and the light guide,
   wherein the first substrate has a first surface connected to the first side surface, the display panel further comprises a black matrix, the black matrix has a third width in a direction perpendicular to a normal direction of the first surface, the second adhesive layer has a second width, and the second width ranges from 0.1 time the third width to 10 times the third width.

2. The display device of claim 1, further comprising an optical film disposed on the first surface of the first substrate, wherein the second adhesive layer is attached to two opposing surfaces of the optical film and the light guide.

3. The display device of claim 1, wherein the light guide has a second surface connected to the second side surface, and the first surface opposite to the second surface, the display device further comprises an optical film disposed on the second surface of the light guide, the display panel further comprises a polarizer disposed on the first surface of the first substrate, and the second adhesive layer is in contact with the optical film and the polarizer.

4. The display device of claim 1, further comprising an optical film disposed on the first surface of the first substrate, wherein the second adhesive layer is in contact with the optical film and the first substrate.

5. The display device of claim 1, wherein the second width of the second adhesive layer is a width in the direction perpendicular to the normal direction of the first surface, and the second width ranges from 0.1 mm to 10 mm.

6. The display device of claim 1, wherein at least part of the first adhesive layer is in contact with the second adhesive layer.

7. The display device of claim 1, further comprising an optical film disposed on the first surface of the first substrate, wherein in the normal direction of the first surface, the second adhesive layer has a second thickness, the first adhesive layer has a first width, a sum of the second thickness and a total thickness of the display panel, the optical film and the backlight module is defined as a third thickness, and the first width is less than or equal to the third thickness.

8. The display device of claim 1, wherein the light guide has a second surface connected to the second side surface, the second surface is opposite to the first surface, the display device further comprises an optical film disposed on the second surface of the light guide, and the second adhesive layer is in contact with the optical film and the first substrate.

9. The display device of claim 1, wherein transmittance of the second adhesive layer ranges from 10% to 50%.

10. The display device of claim 1, wherein at least part of the first adhesive layer is curved.

11. The display device of claim 1, wherein the first adhesive layer has a first thickness in the direction perpendicular to the normal direction of the first surface, and the first thickness ranges from 1 μm to 1000 μm.

12. The display device of claim 1, wherein the light guide has a second surface connected to the second side surface, the second surface is opposite to the first surface, the backlight module further comprises a reflection sheet disposed on a third surface of the light guide, and the third surface is opposite to the second surface.

13. The display device of claim 12, wherein the backlight module further comprises a back film disposed on the reflection sheet.

14. The display device of claim 12, wherein the backlight module further comprises a back film disposed on the reflection sheet and extended to an outer side of the first adhesive layer, and the first adhesive layer is disposed on the back film and between the display panel and the backlight module.

15. The display device of claim 1, wherein a transmittance of the first adhesive layer ranges from 0% to 1%.

16. The display device of claim 1, wherein the light guide has a second surface connected to the second side surface, the second surface is opposite to the first surface, the display device further comprises an optical film, the display panel further comprises a polarizer disposed on the first surface of the first substrate, the optical film is disposed on the second surface of the light guide, and the first adhesive layer is in contact with the polarizer and the optical film.

17. The display device of claim 16, wherein the second adhesive layer is in contact with the light guide.

18. The display device of claim 1, further comprising a decorative layer disposed on an outer side of the first adhesive layer.

* * * * *